United States Patent
Triginai et al.

(10) Patent No.: US 7,146,290 B2
(45) Date of Patent: Dec. 5, 2006

(54) APPARATUS AND METHOD FOR DIAGNOSING PERFORMANCE OF AIR-CONDITIONING SYSTEMS

(75) Inventors: Phil Triginai, Mississauga (CA); Tony Ferraro, Mississauga (CA); William Frederick Waters, Mississauga (CA)

(73) Assignee: UView Ultraviolet Systems, Inc., Mississuaga (CA)

( * ) Notice: Subject to any disclaimer, the term of this patent is extended or adjusted under 35 U.S.C. 154(b) by 0 days.

(21) Appl. No.: 10/374,006

(22) Filed: Feb. 25, 2003

(65) Prior Publication Data

US 2003/0158704 A1 Aug. 21, 2003

Related U.S. Application Data

(63) Continuation-in-part of application No. 10/191,955, filed on Jul. 8, 2002, now Pat. No. 6,732,538, which is a continuation-in-part of application No. 09/723,137, filed on Nov. 27, 2000, now Pat. No. 6,442,953.

(51) Int. Cl.
*G06F 11/30* (2006.01)

(52) U.S. Cl. .......................... 702/182; 62/127

(58) Field of Classification Search ................ 702/99, 702/104, 116, 118, 130–132, 136, 188, 182–185; 62/129, 130, 137, 171, 127; 361/700, 704; 710/15; 236/51; 362/700, 704
See application file for complete search history.

(56) References Cited

U.S. PATENT DOCUMENTS

| | | | |
|---|---|---|---|
| 4,406,396 A * | 9/1983 | Habegger ................. | 236/1 G |
| 4,798,055 A | 1/1989 | Murray et al. ............ | 62/127 |
| 5,560,213 A | 10/1996 | Wieszt | |
| 5,647,222 A | 7/1997 | Sarakinis | |
| 6,101,820 A | 8/2000 | Cheballah | |
| 6,104,611 A * | 8/2000 | Glover et al. ............ | 361/700 |
| 6,122,678 A * | 9/2000 | Eckel et al. .............. | 710/15 |
| 6,128,910 A | 10/2000 | Faircloth | |
| 6,213,404 B1 * | 4/2001 | Dushane et al. .......... | 236/51 |
| 6,222,317 B1 * | 4/2001 | Vollkommer et al. ..... | 313/582 |
| 6,223,545 B1 * | 5/2001 | Kinkel et al. ............ | 62/171 |
| 6,324,854 B1 | 12/2001 | Jayanth ................... | 62/127 |
| 6,360,551 B1 | 3/2002 | Renders .................. | 62/127 |
| 6,370,891 B1 * | 4/2002 | Marshall et al. ......... | 62/130 |
| 2003/0014218 A1 | 1/2003 | Trigiani et al. .......... | 702/183 |

FOREIGN PATENT DOCUMENTS

| | | |
|---|---|---|
| EP | 1 177 924 A | 2/2002 |
| WO | WO 02 42100 A | 5/2002 |

OTHER PUBLICATIONS

Robinair, "A/C Diagnostic Tool" SPX corporation.*
Bright Solutions, Inc., "A/C Investigator".*
Bright Solutions, Inc., "A/C Diagnostic Breakthrough!".*
European Search Report, dated Jan. 12, 2006.

\* cited by examiner

*Primary Examiner*—Marc S. Hoff
*Assistant Examiner*—Mohamed Charioui
(74) *Attorney, Agent, or Firm*—Bell Boyd & Lloyd LLC (57) ABSTRACT

The present application reveals a device for verifying a proper heat exchange and overall performance of an air-conditioning system. The device includes means for measuring a temperature differential between ambient and vent temperatures of the air-conditioning system, where the means comprises at least two remote probes for measuring the ambient and vent temperatures, or a remote ambient probe for measuring ambient temperatures and an integral vent probe for measuring vent temperatures; and means for analyzing the temperature differential in order to give an indication of performance of the air-conditioning system.

19 Claims, 8 Drawing Sheets

UView Ultraviolet
Systems Inc.

Auto Air conditioning
Diagnostic Report

System Type: TXV
Condenser in – 152F
Condenser out – 121F
PASS
Evaporator in – 114F
Evaporator out – 52F
FAIL
Ambient – 88F
Vent – 52F
PASS
Relative Humidity 39%
Overall Diagnostic
Number 28

UView Ultraviolet
Systems Inc.

Auto Air conditioning
Diagnostic Report

System Type: TXV
Condenser in – 151F
Condenser out – 121F
PASS
Evaporator in – 113F
Evaporator out – 50F
FAIL
Ambient – 87F
Vent – 53F
PASS
Relative Humidity 40%
Overall Diagnostic
Number 28

UView Ultraviolet
Systems Inc.

Auto Air conditioning
Diagnostic Report

System Type: OT
Condenser in – 151F
Condenser out – 120F
PASS
Evaporator in – 113F
Evaporator out – 56F
FAIL
Ambient – 88F
Vent – 53F
PASS
Relative Humidity 38%
Overall Diagnostic
Number 3

APPARATUS AND METHOD FOR DIAGNOSING PERFORMANCE OF AIR-CONDITIONING SYSTEMS

The present application is a continuation-in-part of U.S. patent application Ser. No. 10/191,955, filed Jul. 8, 2002, now U.S. Pat. No. 6,732,538, which is a continuation-in-part of U.S. patent application Ser. No. 09/723,137, filed Nov. 27, 2000, now U.S. Pat. No. 6,442,953, the entire contents of each are hereby incorporated by reference and relied upon.

BACKGROUND OF THE INVENTION

1. Field of the Invention

The present invention is for an apparatus and method to diagnose and performance test air-conditioning systems using temperature differentials of critical components, ambient temperature and humidity, along with software data.

2. Description of the Related Art

In the past, a pressure reading manifold was used in diagnosing air-conditioning performance. The manifold was connected to the high and low sides of the air-conditioning system and operating pressures read. Over the past decade, air-conditioning systems added complexity, thus making pressure readings alone not acceptable for diagnosing system performance. The pressure readings were also used in conjunction with ambient temperature, humidity or vent temperature to give a better indication of air-conditioning system performance. Even where temperatures are required for measuring system performance, prior art methods use a surface contact thermometer or an infrared (IR) thermometer, each of which only measures one reading at a time.

Neutronics, Inc. (Exton, Pa.) manufactures a device for SPX Robinair (Montpelier, Ohio) that uses temperatures and pressures to lead a technician through a series of tests and checks to diagnose an air-conditioning system and its components. Each temperature is taken at a static moment, using infrared (IR) technology. Using the device is very time consuming with multi-level testing and each temperature reading requires an operator to apply tape to a joint or connection being measured. The temperatures are not "live" as each is taken and recorded with a single measuring probe. The operator of this device needs to be knowledgeable in air-conditioning systems and performance testing.

Bright Solutions, Inc. (Troy, Mich.) manufactures a device that uses pressures along with various temperatures to go through a complex flow chart to diagnose component and system failures. The operator of the device needs some time to connect and operate the device, which leads the operator each and every step of the process. The operator of the device needs to be knowledgeable in air-conditioning systems and performance testing.

UView Ultraviolet Systems, Inc. (Mississauga, Canada) manufactures a device that determines a temperature differential between ambient and vent temperatures in an air-conditioning system and also calculates the temperature differential across the condenser. The device uses the multiple differential data along with ambient relative humidity to give an operator a diagnostic test and trouble code for diagnosis.

There is a need in the field for a simplified apparatus that allows for a quick performance test of an air-conditioning system without disrupting the integrity of the sealed air-conditioning system and that eliminates the danger of exposure to high pressure refrigerants.

SUMMARY OF THE INVENTION

The present application discloses a method and an apparatus for diagnosing performance of an air-conditioning system. The method comprises the steps of identifying whether the air-conditioning system comprises a fixed orifice type configuration or a thermostatic expansion valve type configuration; determining a temperature differential between inlet and outlet temperatures of a condenser in the air-conditioning system; determining a temperature differential between inlet and outlet temperatures of an evaporator in the air-conditioning system; determining a temperature differential between ambient and vent temperatures in the air-conditioning system; analyzing the differentials of the condenser, evaporator and ambient and vent temperatures for the fixed orifice type configuration and analyzing the differentials of the condenser and ambient and vent temperatures for the thermostatic expansion valve type configuration; determining whether the air-conditioning system is properly functioning; and diagnosing performance of the air-conditioning system.

In preferred embodiments of the method, a temperature differential of greater than 10° F. across the condenser is determinative of whether the air-conditioning system is properly functioning; a temperature differential of less than ±10° F. across the evaporator is determinative of whether the air-conditioning system is properly functioning; and a temperature differential of greater than 25° F. between the ambient and vent temperature is determinative of whether the air-conditioning system is properly functioning.

In another preferred embodiment, the method further comprises determining relative humidity of the ambient air; and analyzing the relative humidity and the differentials of the condenser, evaporator and ambient and vent temperatures for the fixed orifice type configuration or analyzing the relative humidity and the differentials of the condenser and ambient and vent temperatures for the thermostatic expansion valve type configuration.

The apparatus for diagnosing performance of an air-conditioning system comprises means for determining a temperature differential between inlet and outlet temperatures of a condenser in the air-conditioning system; means for determining a temperature differential between inlet and outlet temperatures of an evaporator in the air-conditioning system; means for determining a temperature differential between ambient and vent temperatures in the air-conditioning system; means for analyzing the differentials of the condenser, evaporator and ambient and vent temperatures for a fixed orifice type of air-conditioning system and means for analyzing the differentials of the condenser and ambient and vent temperatures for a thermostatic expansion valve type of air-conditioning system; means for determining whether the air-conditioning system is properly functioning; and means for diagnosing performance of the air-conditioning system.

In preferred embodiments of this apparatus, a temperature differential of greater than 10° F. across the condenser is determinative of whether the air-conditioning system is properly functioning; a temperature differential of less than ±10° F. across the evaporator is determinative of whether the air-conditioning system is properly functioning; and a temperature differential of greater than 25° F. between the ambient and vent temperature is determinative of whether the air-conditioning system is properly functioning.

In another preferred embodiment, the apparatus further comprises means for determining relative humidity of the ambient air, and means for analyzing the relative humidity and the differentials of the condenser, evaporator and ambient and vent temperatures for the fixed orifice type of air-conditioning system and means for analyzing the relative humidity and the differentials of the condenser and ambient and vent temperatures for the thermostatic expansion valve type of air-conditioning system.

The present application also discloses a simplified method and device for diagnosing performance of an air-conditioning system. The method comprises the steps of determining a temperature differential between inlet and outlet temperatures of a condenser, or between ambient and vent temperatures in the air-conditioning system; analyzing the temperature differential to determine whether the air-conditioning system is properly functioning; and diagnosing performance of the air-conditioning system.

In preferred embodiments of the method, a temperature differential of greater than 10° F. across the condenser is determinative of whether the air-conditioning system is properly functioning and a temperature differential of greater than 25° F. between the ambient and vent temperature is determinative of whether the air-conditioning system is properly functioning.

The simplified device for diagnosing performance of an air-conditioning system comprises means for determining a temperature differential between inlet and outlet temperatures of a condenser, or between ambient and vent temperatures in the air-conditioning system; means for analyzing the temperature differential to determine whether the air-conditioning system is properly functioning; and means for diagnosing performance of the air-conditioning system.

In preferred embodiments of the simplified device, a temperature differential of greater than 10° F. across the condenser is determinative of whether the air-conditioning system is properly functioning and a temperature differential of greater than 25° F. between the ambient and vent temperature is determinative of whether the air-conditioning system is properly functioning.

The present application also discloses another simplified method and device for diagnosing performance of an air-conditioning system. This method comprises the steps of determining temperature differentials between inlet and outlet temperatures of a condenser and between ambient and vent temperatures; analyzing the temperature differentials to determine whether the air-conditioning system is properly functioning; and diagnosing performance of the air-conditioning system.

In preferred embodiments of this method, a temperature differential of greater than 10° F. across the condenser is determinative of whether the air-conditioning system is properly functioning and a temperature differential of greater than 25° F. between the ambient and vent temperature is determinative of whether the air-conditioning system is properly functioning.

This simplified device for diagnosing performance of an air-conditioning system comprises means for determining temperature differentials between inlet and outlet temperatures of a condenser and between ambient and vent temperatures; means for analyzing the temperature differentials to determine whether the air-conditioning system is properly functioning; and means for diagnosing performance of the air-conditioning system.

In preferred embodiments of this device, a temperature differential of greater than 10° F. across the condenser is determinative of whether the air-conditioning system is properly functioning and a temperature differential of greater than 25° F. between the ambient and vent temperature is determinative of whether the air-conditioning system is properly functioning.

The present application also discloses a device for verifying a proper heat exchange and overall performance of an air-conditioning system. The device comprises means for measuring a temperature differential between ambient and vent temperatures of the air-conditioning system; and means for analyzing the temperature differentials in order to give an indication of performance of the air-conditioning system. The device adjusts the pass differential based on ambient temperature using an algorithm. Generally, as the ambient temperature increases so does the differential.

The present application also discloses a device for verifying a proper heat exchange and overall performance of an air-conditioning system, comprising means for measuring a temperature differential between ambient and vent temperatures of the air-conditioning system, where the means comprises at least two remote probes for measuring the ambient and vent temperatures, or a remote ambient probe for measuring ambient temperatures and an integral vent probe for measuring vent temperatures, or a remote vent probe for measuring vent temperatures and an integral ambient probe for measuring ambient temperatures; and means for analyzing the temperature differential in order to give an indication of performance of the air-conditioning system.

In a preferred embodiment of this device, a temperature differential of greater than 25° F. between the ambient and vent temperature is determinative of whether the air-conditioning system is properly functioning.

In other preferred embodiments, the device further comprises an LCD readout for displaying the temperatures; at least one LED; or means for indicating a pass/fail diagnosis.

In other preferred embodiments, the device further comprises at least two LEDs; at least three LEDs; or means for indicating a pass/acceptable/fail diagnosis.

Finally, in yet another preferred embodiment, the device further comprises means to automatically adjust the temperature differential for changing ambient temperatures using an algorithm, thereby changing a pass/fail indication point.

DETAILED DESCRIPTION

The present invention is for an apparatus and method using the temperature differentials of critical components, ambient temperature and relative humidity, along with a built in software data chart to diagnose and performance test air-conditioning systems. The chart is also available as a hardcopy in an operating manual with trouble codes directly linked to the diagnostic measurements taken. The simplified apparatus and method allow quick performance test and quick diagnosis for even inexperienced air-conditioning technicians.

Figure 1:
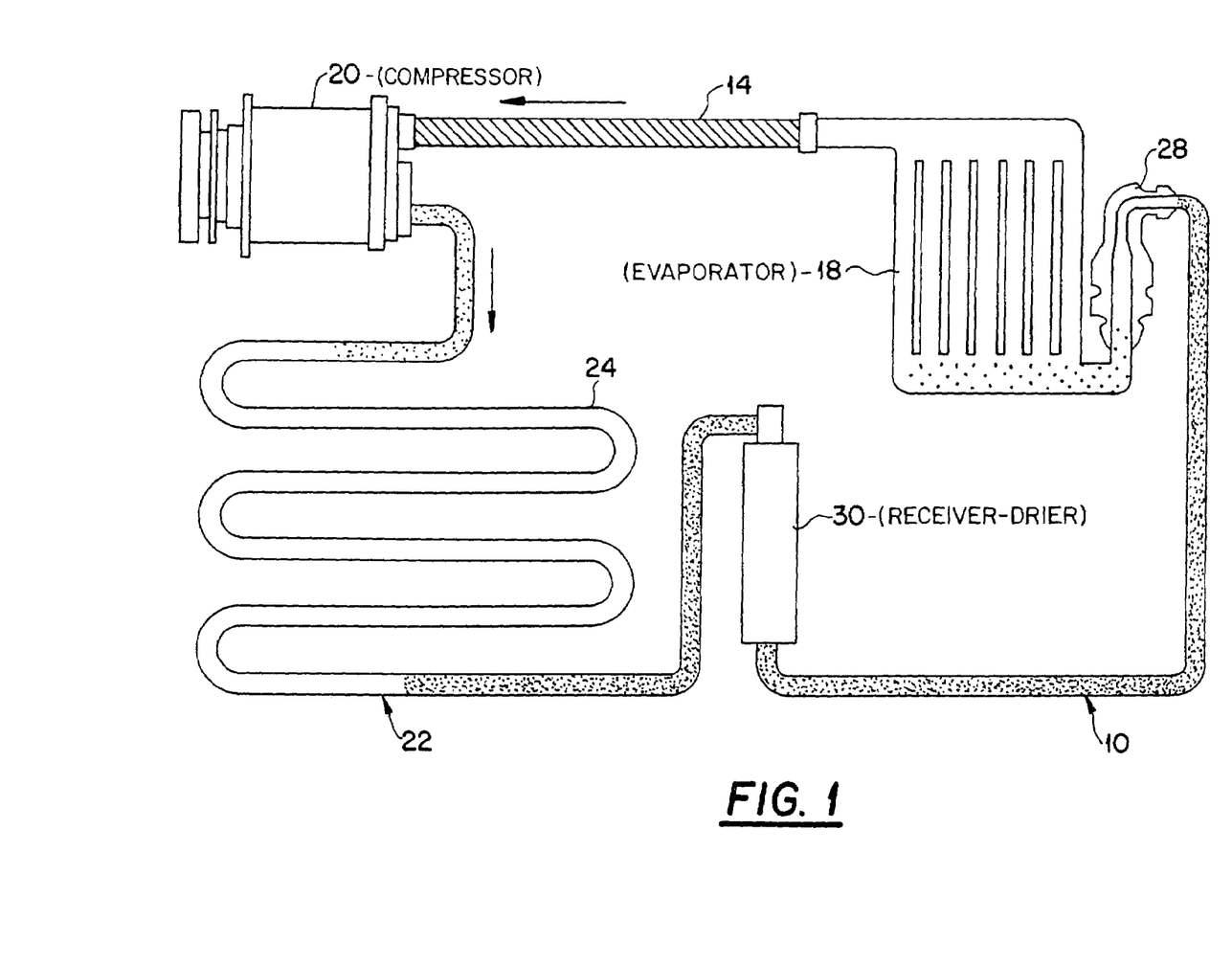
FIG. 1 is an illustration of a basic refrigeration system of an automotive air-conditioning system—thermostatic expansion valve (TXV) type system.
Figure 2:
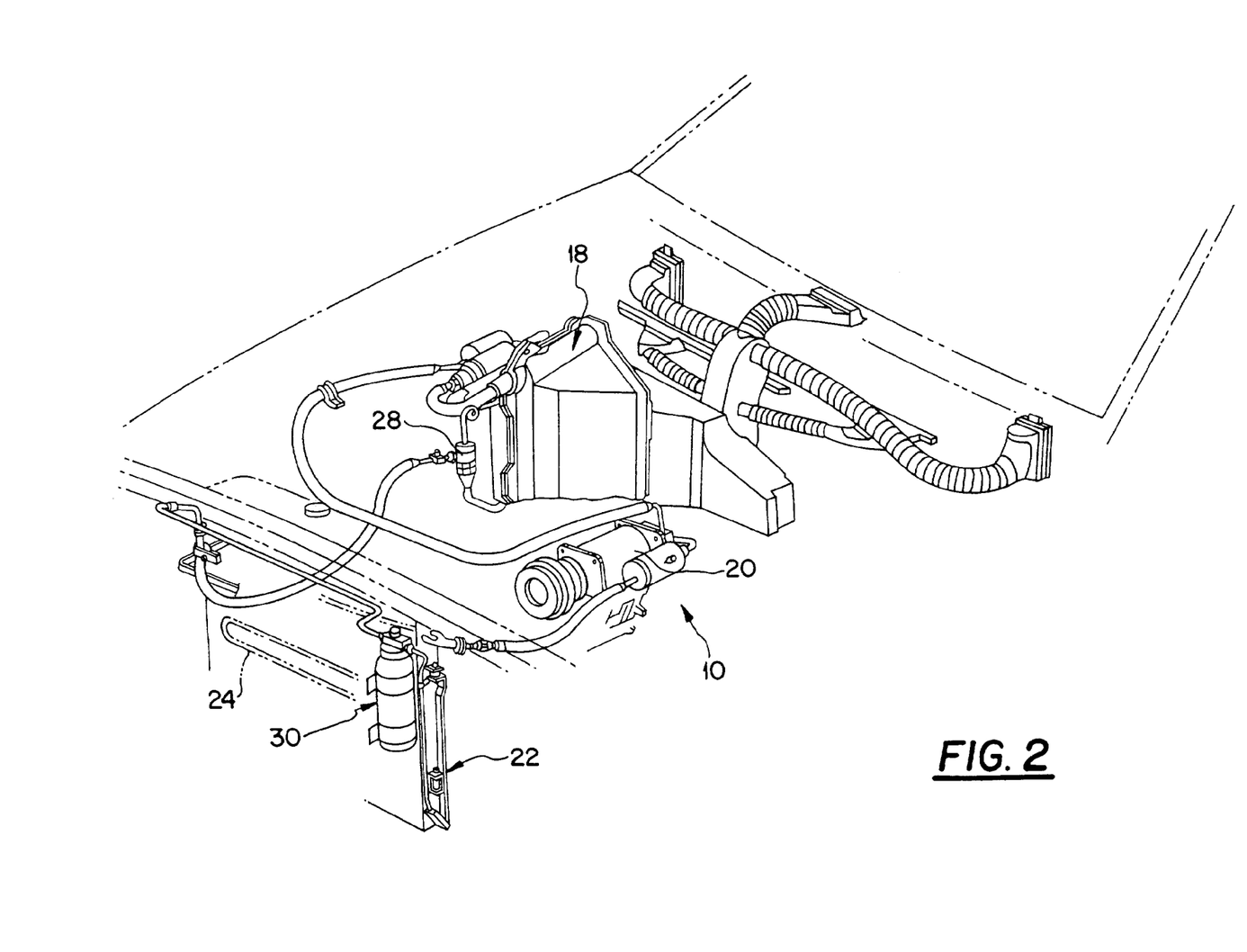
FIG. 2 is a perspective view of an automotive air-conditioning system showing the major components—thermostatic expansion valve type system.

Referring to the drawings in detail, wherein like numerals indicate like elements, FIGS. 1 and 2 illustrate a basic refrigeration system of an automotive air-conditioning system—thermostatic expansion valve (TXV) type system. FIG. 1 illustrates the basic automotive air-conditioning system 10, by which air inside a vehicle is cooled and dehumidified. FIG. 2 provides greater detail of the system as it is arranged in a vehicle.

A refrigerant 14, such as R-12, R134a, hydrocarbon (HC) or carbon dioxide ($CO_2$), circulates under pressure in the air-conditioning/refrigeration system. In each cycle, the refrigerant is caused to change phase from liquid to gas and back to liquid, absorbing heat from the passenger compartment of the vehicle and releasing heat outside the compartment.

More specifically, the air-conditioning system has an evaporator 18 unit where sub-cooled liquid refrigerant enters and is allowed to expand and absorb heat from warm air of the passenger compartment, causing the refrigerant to vaporize. The warm air of the passenger compartment is connected to the evaporator 18 via ducting, as seen in FIG. 2, such that cooled and dried air is re-circulated into the passenger compartment. After absorbing heat from the passenger compartment, the refrigerant gas is drawn from the evaporator 18 by suction into a compressor 20, which compresses the gas, thereby raising its pressure and temperature. The high-pressure hot vapor is passed through a condenser 22, in which the vapor is exposed to a large cooling-surface area by flowing through a labyrinth of finned-coils 24 over which outside air is rapidly blown to transport heat away from the vapor. The refrigerant 14 cools to the condensation temperature, releases its heat of condensation and changes phase back to a hot liquid, still at a high pressure. The refrigerant 14 completes the cycle by passing through a thermostatic expansion valve 28, which meters the high pressure liquid refrigerant 14 as a low pressure spray into the evaporator 18.

In some systems, it is necessary to reservoir the liquid refrigerant before it is metered through the expansion valve because the demand of the evaporator varies under varying conditions. In other systems, it is a practice to install an accumulator between the evaporator and compressor so that no liquid can enter the compressor. In either system, water contamination in the refrigerant can cause the water vapor to freeze at the point of expansion, causing refrigerant flow to be blocked, and to react with refrigerants to form acids that may cause internal damage to metal parts. Consequently, in the depicted embodiment, a receiver-dehydrator, also referred to as a receiver-drier, 30 is located between the condenser 22 and the evaporator 18 to reservoir the refrigerant and remove moisture from it. In other air-conditioning systems (as shown in FIG. 3), an accumulator-dehydrator 32 may be located between the evaporator and compressor to accumulate the refrigerant vapor and remove moisture from it.

Figure 3:
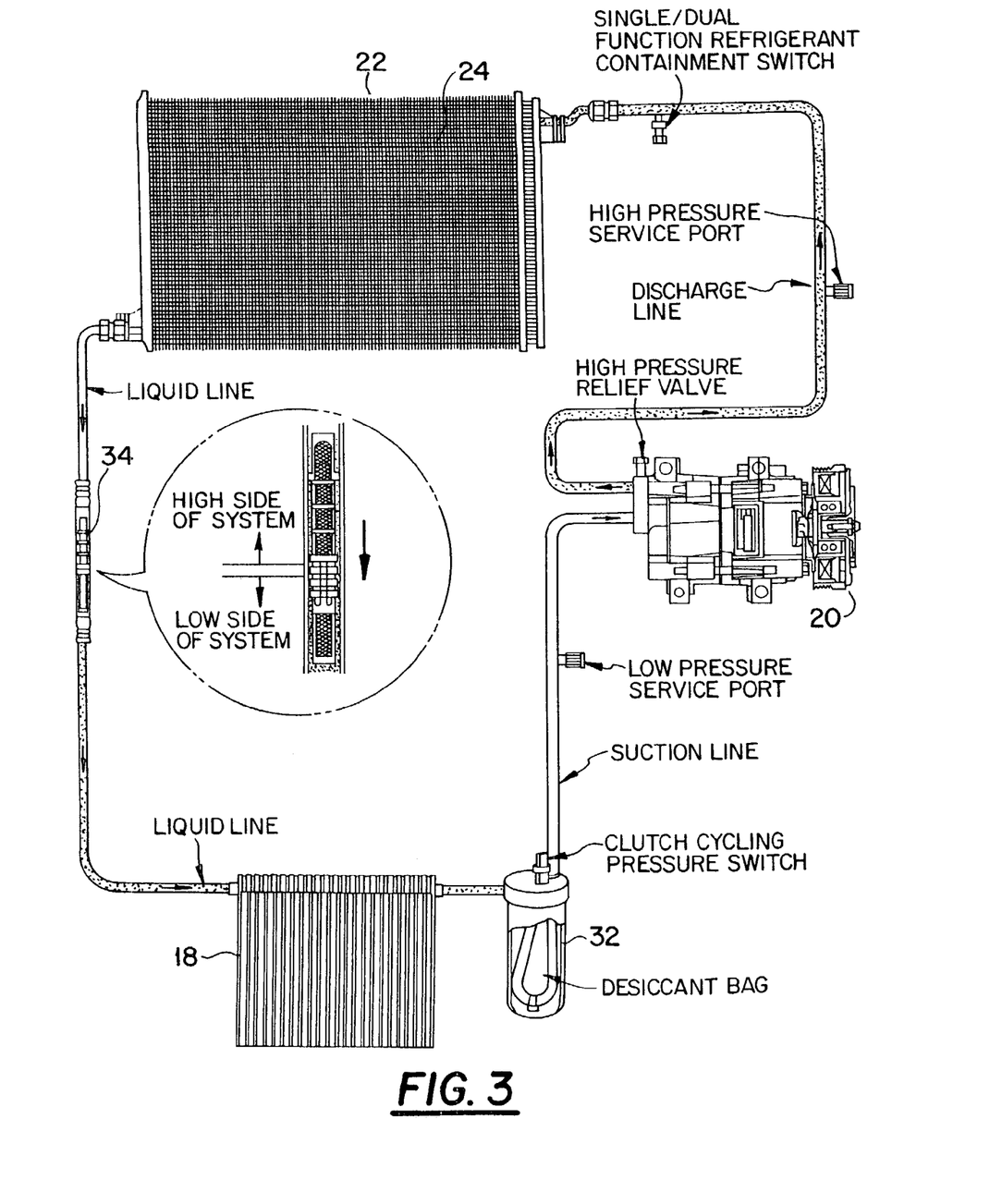
FIG. 3 is an illustration of another basic refrigeration system of an automotive air-conditioning system—fixed orifice type system.

FIG. 3 is an illustration of another basic refrigeration system of an automotive air-conditioning system—fixed orifice type system. The fixed orifice type configuration resembles the thermostatic expansion valve type configuration. The main difference between the configurations is the control of the compressor and hence the temperature of refrigerant inside the evaporator. In the fixed orifice type configuration, an orifice tube 34 is positioned between the condenser 22 and the evaporator 18. The compressor is usually cycled for optimal evaporator temperature using a pressure switch. The differences in configuration will determine the mode of operation for the apparatus of the present invention.

The apparatus of the present invention (see FIG. 4) uses temperature data from two key components of the air-conditioning system, namely, the condenser and evaporator. The apparatus measures inlet and outlet temperatures and calculates the differential of these two critical components along with ambient temperature and air-conditioning vent temperature, all simultaneously. The apparatus also uses the ambient relative humidity as a guideline for determining trouble codes and subsequent diagnostic guideline areas. By using these readings and their differentials with a diagnostic chart (Table 1), an air-conditioning system can be performance tested and even diagnosed.

More specifically, the apparatus uses the temperature difference between the ambient and vent temperatures and evaporator and condenser inlet and outlet temperatures to diagnose the performance of an air-conditioning system. The evaporator readings are only useful on air-conditioning systems containing a fixed orifice tube. On TXV type systems, the evaporator readings are not referenced in the diagnosis because the function of the thermostatic expansion valve is to modify flow to the evaporator effecting temperature readings.

Extensive testing has shown a definite correlation between these temperature differentials and system operation and problems. Various temperature differences are used to identify problems and suggest typical repairs.

The basis for the invention is the finding that the differences between the condenser inlet and outlet temperatures, evaporator inlet and outlet temperatures and the ambient and vent temperatures can be related to the system performance and can locate a component that is not functioning properly. Extensive testing has shown that a temperature differential of >10° F. across a condenser, less than ±10° F. across an evaporator and >25° F. between the ambient and vent temperature is normal for a properly functioning air-conditioning system. Any differential temperatures outside these ranges indicate that the air-conditioning system is not performing properly.

A major advantage of the present invention is that it allows the diagnosis of the air-conditioning system without disrupting the integrity of the sealed air-conditioning system. Newer air-conditioning systems have a much smaller volume of refrigerant than older air-conditioning systems. Thus, the newer air-conditioning systems are more critically charged. By not accessing the sealed air-conditioning systems, the present invention does not affect its seals or volumes. Also, the present invention eliminates the danger of exposure to high pressure refrigerants. The present invention will allow a non-certified or minimally trained technician to safely diagnose the air-conditioning system without any environmental concerns for a potential accidental discharge of refrigerant and the related safety aspects of accessing the high pressure refrigerant lines.

EXAMPLES

The following examples are included to demonstrate preferred embodiments of the invention. It should be appreciated by those skilled in the art that the techniques disclosed in the examples which follow represent techniques discovered by the inventors to function well in the practice of the invention, and thus can be considered to constitute preferred modes for its practice. However, those of skill in the art will, in light of the present disclosure, appreciate that many changes can be made in the specific embodiments which are disclosed and still obtain a like or similar result without departing from the concept, spirit and scope of the invention. More specifically, it will be apparent that certain components that are both mechanically and electronically related may be substituted for the components described herein while the same or similar results would be achieved. All such similar substitutes and modifications apparent to those skilled in the art are deemed to be within the spirit, scope and concept of the invention as defined by the appended claims.

To demonstrate the feasibility of the concept, several prototypes were constructed. Temperatures were measured using integrated circuit (IC) temperature sensors; however thermocouples (T/Cs), thermistors, resistance temperature detectors (RTDs) or IR (optical) temperature sensors could be used. The apparatus seen in FIG. 4 was used in Examples 1–3. A cable harness connected the sensors to a cable connection 42 of the unit 40, with clamps holding the temperature sensors onto the air-conditioning piping (not shown). Care was taken to thermally isolate the sensor from the clamp to ensure accurate readings.

Figure 4:
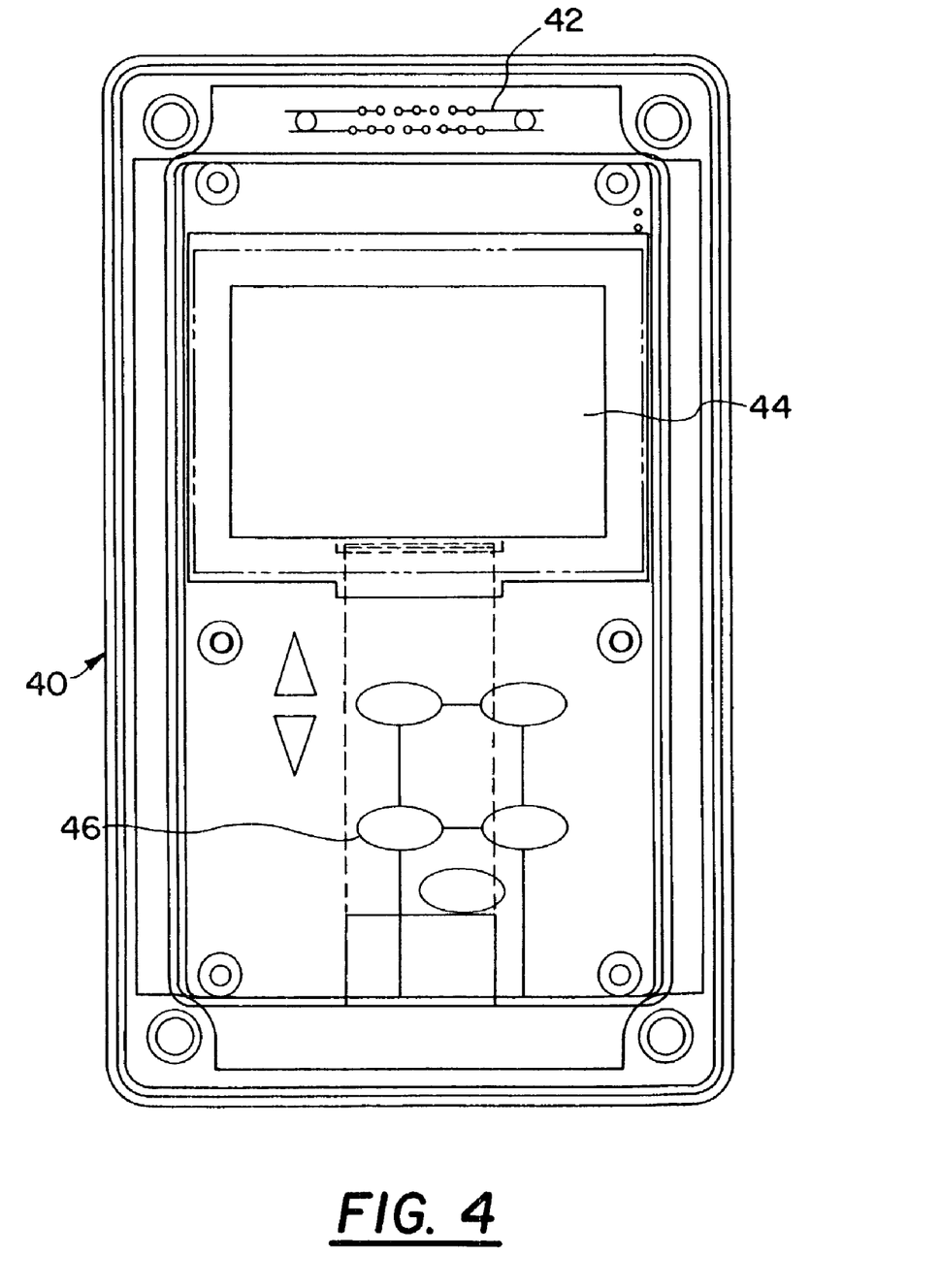
FIG. 4 is an illustration of the apparatus of the present invention for diagnosing and performance testing air-conditioning systems.

Output from the temperature sensors was conditioned using operational amplifiers and converted to a digital signal via an analogue to digital converter (A/D converter) on board a microprocessor. These signals may or may not be multiplexed, depending on the microprocessor used. The voltage readings were averaged over a period of time. A look-up table was used to convert the averaged readings into degrees F. An optional table provides degree C. readings at the operator's discretion. An LCD 44 displays all measurements and menu choices.

The microprocessor performs the following functions: reads temperatures, provides menu to LCD, calculates the differential temperatures and determines the diagnostic number by using a look-up table to assign diagnostic numbers depending on differential temperatures. The operator selects either an orifice tube or thermal expansion valve (TXV) system via a button 46, which instructs the microprocessor on which diagnostic look-up to use. There are several look-up tables, which can be dependent on many variables such as, for example, ambient temperature, ambient relative humidity, system configuration, component structure (cross-flow condensers). The look-up tables can also be carried for different refrigerant types, for example, R-12, R-134a, carbon dioxide ($CO_2$), hydrocarbon (HC) and other combination solutions.

A relative humidity (RH) sensor can aid in diagnosis by assisting in determining the load on the system. A resistive sensor was used, but any other type of electronic RH sensor could be used.

The unit is handheld and battery operated. A scroll feature allows the operator to view temperatures and relative humidity. Pressing the hold button stores all values and allows a diagnostic number and condition of each component to be viewed by scrolling through the menu. A print button is used to print all temperatures, performance and diagnostic numbers on a linked or infrared printer.

A diagnostic chart is used to relate diagnostic numbers to system problems, listed in their most frequently occurring order (see Table 1).

Example 1

The air-conditioning system—TXV type (Nippondenso compressor, R-134a refrigerant, 38 ounces) in a 1991 Dodge Spirit (2.5 liter engine) was performance tested and diagnosed with the present invention. The owner complained that vent air from the air-conditioning system was not cold enough.

The apparatus of the present invention was connected to the condenser and evaporator of the air-conditioning system. The apparatus measured inlet and outlet temperatures and calculated the differential of these two critical components along with ambient temperature and air-conditioning vent temperature, all simultaneously. The advantage of simultaneous measurements is important in eliminating erroneous readings from temperature fluctuations in air-conditioning system operation. The apparatus also measured the relative humidity.

As seen in Table 2, vehicle test 1A, the inlet condenser temperature was 149° F. and the outlet condenser temperature was 116° F. A temperature differential of >10° F. across a condenser is normal for a properly functioning air-conditioning system.

The inlet evaporator temperature was 86° F. and the outlet evaporator temperature was 87° F. A temperature differential of ±10° F. across an evaporator is normal for a properly functioning air-conditioning system. However, this differential was not used in determining whether the air-conditioning system was properly functioning since the system was of the TXV type.

The ambient temperature was 86° F. and the vent temperature was 66° F. However, a temperature differential of <25° F. between the ambient and vent temperature is indicative of an improperly functioning air-conditioning system.

The apparatus also measured the relative humidity at 37%. By using these readings and their differentials with a diagnostic chart, the air-conditioning system was performance tested and diagnosed, i.e., the heater door of the air-conditioning system was found to be out of adjustment. After adjusting the heater door, the air-conditioning system was re-tested. As seen in Table 2, vehicle test 1B, all values were now found to be within normal limits and the vent air from the air-conditioning system was now cold.

Example 2

The air-conditioning system—fixed orifice type (R-134a refrigerant, 32 ounces) in a 1997 Pontiac Bonneville (3.8 liter engine) was performance tested and diagnosed with the present invention. The owner complained that vent air from the air-conditioning system was not cold enough.

The apparatus of the present invention was connected to the condenser and evaporator of the air-conditioning system. The apparatus measured inlet and outlet temperatures and calculated the differential of these two critical components along with ambient temperature and air-conditioning vent temperature, all simultaneously. The apparatus also measured the relative humidity.

As seen in Table 2, vehicle test 2A, the inlet condenser temperature was 136° F. and the outlet condenser temperature was 89° F. A temperature differential of >10° F. across a condenser is normal for a properly functioning air-conditioning system.

The inlet evaporator temperature was 43° F. and the outlet evaporator temperature was 73° F. A temperature differential of greater than 10° F. across an evaporator is indicative of an improperly functioning air-conditioning system.

The ambient temperature was 84° F. and the vent temperature was 68° F. A temperature differential of <25° F. between the ambient and vent temperature is indicative of an improperly functioning air-conditioning system.

The apparatus also measured the relative humidity at 68%. By using these readings and their differentials with a diagnostic chart, the air-conditioning system was performance tested and diagnosed, i.e., the air-conditioning system was found to be 50% low on refrigerant. After re-charging with refrigerant, the air-conditioning system was re-tested. As seen in Table 2, vehicle test 2B, all values were now found to be within normal limits and the air-conditioning system produced cold air.

Example 3

The air-conditioning system—fixed orifice type (R-134a refrigerant, 44 ounces) in a 1999 Cadillac Escalade (5.7 liter engine) was performance tested and diagnosed with the present invention. The owner complained that the air-conditioning system took too long to cool down the compartment.

The apparatus of the present invention was connected to the condenser and evaporator of the air-conditioning system. The apparatus measured inlet and outlet temperatures and calculated the differential of these two critical components along with ambient temperature and air-conditioning vent temperature, all simultaneously. The apparatus also measured the relative humidity.

As seen in Table 2, vehicle test 3A, the inlet condenser temperature was 124° F. and the outlet condenser temperature was 91° F. A temperature differential of >10° F. across a condenser is normal for a properly functioning air-conditioning system.

The ambient temperature was 79° F. and the vent temperature was 49° F. A temperature differential of >25° F. between the ambient and vent temperature is normal for a properly functioning air-conditioning system.

The inlet evaporator temperature was 54° F. and the outlet evaporator temperature was 71° F. A temperature differential of greater than 10° F. across an evaporator is indicative of an improperly functioning air-conditioning system.

The apparatus also measured the relative humidity at 75%. By using these readings and their differentials with a diagnostic chart, the air-conditioning system was performance tested and diagnosed, i.e., the air-conditioning system was found to be 25% low on refrigerant. After re-charging with refrigerant, the air-conditioning system was re-tested. As seen in Table 2, vehicle test 3B, all values were now found to be within normal limits and the air-conditioning system cooled down the compartment in a reasonable period of time.

Figure 5:
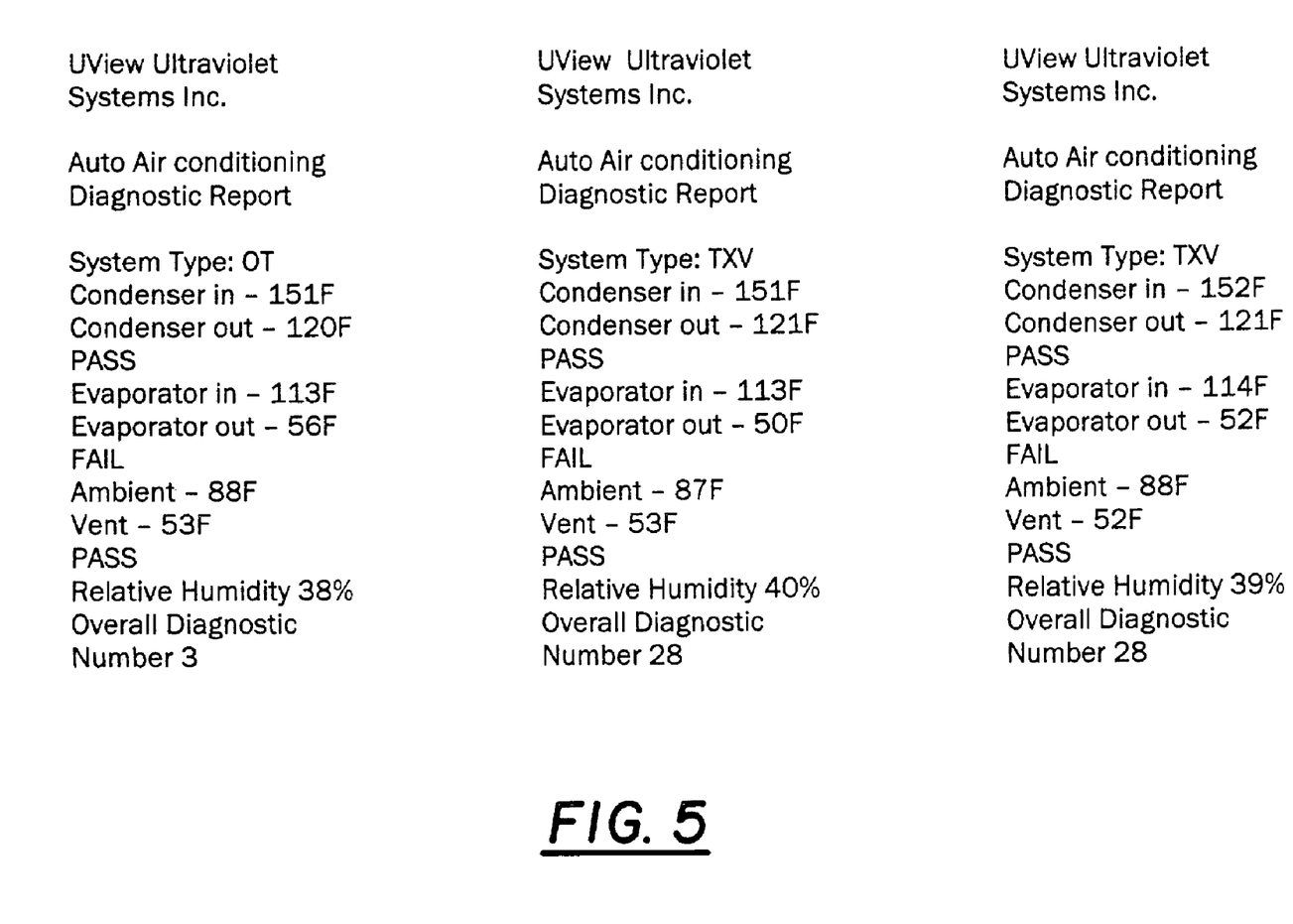
FIG. 5 is a print out of three auto air-conditioning diagnostic reports.

FIG. 5 is a print out of three additional auto air-conditioning diagnostic reports. Each report shows the condenser inlet and outlet temperatures, evaporator inlet and outlet temperatures and the ambient and vent temperatures, whether each of the temperature differentials pass or fail, the relative humidity, and an overall diagnostic number for each report.

We have now developed a simplified device and method that allows for a quick performance test of an air-conditioning system without disrupting the integrity of the sealed air conditioning system and that eliminates the danger of exposure to high pressure refrigerants. Taking all of the readings with the conventional system can be time consuming.

After performing many tests, we noticed that there is a direct correlation of the temperature differential between ambient and vent temperatures in a normally functioning air-conditioning system. Using an algorithm, a technician can quickly verify that a system is functioning properly. The only downfall of this simplified system is that if the apparatus indicates a failure, the simplified system will not pinpoint or direct the technician as to what the possible problem may be. This simplified test is very quick and useful to the technician because it is not time consuming like other performance test methods. The test also quickly verifies a proper heat exchange for the entire system.

A simple dual temperature thermometer could be used except that the data obtained would not be useful. There is more heat load on the condenser from engine heat and road heat. One must measure the air entering the condenser for accurate diagnosis of the air-conditioning system. The preferred method would be to measure the ambient temperature about one (1) foot in front of the condenser and about one (1) foot off the ground using a fastener connected to the front of the vehicle. This could be a magnetic extension or a clip with extension to hold the temperature reading device static throughout the test.

None of the currently available testing devices is as simple, easy or as quick to use as the present simplified device. This device will simply give a positive result of a well performing system but will not give any direction for diagnosis if the system fails. The operator will have to refer to manuals or use one of the above-described devices for further diagnosis.

A major advantage of the simplified device is that it allows the diagnosis of the air-conditioning system without disrupting the integrity of the sealed air-conditioning system. Newer air-conditioning systems have a much smaller volume of refrigerant than older air-conditioning systems. Thus, the newer air-conditioning systems are more critically charged. By not accessing the sealed air-conditioning systems, the present invention does not affect its seals or volumes. Also, the simplified device eliminates the danger of exposure to high pressure refrigerants. New generation refrigerants like carbon dioxide make these issues incrementally more pronounced with even higher pressures (e.g., up to ten times those for R-134a refrigerant) and very low critical charges (e.g., as low as 50 grams of refrigerant).

The simplified device will allow a non-certified or minimally trained technician to safely diagnose the air-conditioning system without any environmental concerns for a potential accidental discharge of refrigerant and the related safety aspects of accessing the high pressure refrigerant lines.

The simplified device of the present invention uses temperature data from the condenser. The device measures inlet and outlet temperatures and calculates the differential of the condenser along with ambient temperature and air-conditioning vent temperature, simultaneously or any combination of single differentials. The device may also use the ambient relative humidity as a guideline for determining trouble codes and subsequent diagnostic guideline areas. By using these readings and their differentials with a diagnostic chart (Table 1), an air-conditioning system can be performance tested and even diagnosed.

More specifically, the device uses the temperature difference between the ambient and vent temperatures and between the condenser inlet and outlet temperatures to diagnose the performance of an air-conditioning system.

Extensive testing has shown a definite correlation between these temperature differentials and system operation and problems. Various temperature differences are used to identify problems and suggest typical repairs.

The basis for the invention is the finding that the differences between the condenser inlet and outlet temperatures and the ambient and vent temperatures can be related to the system performance and can locate a component that is not functioning properly. Extensive testing has shown that a temperature differential of >10° F. and <50° F. across a condenser and >25° F. between the ambient and vent temperature is normal for a properly functioning air-conditioning system. Any differential temperatures outside these ranges indicate that the air-conditioning system is not performing properly at a given specific ambient temperature. The simplified temperature differential device shown in FIGS. 6 and 7A was used in Examples 4–6.

Example 4

The air-conditioning system—TXV type (R-134a refrigerant, 2.12 lbs.) in a 1997 Dodge Caravan was performance tested and diagnosed with the simplified device of the present invention. The owner complained that vent air from the air-conditioning system was not cold enough. A simple vent thermometer reading was taken and recorded at 51.4° F.

The simplified device was connected to the condenser of the air-conditioning system. The device measured inlet and outlet temperatures and calculated the temperature differential. The condenser inlet measured 162.5° F. and the condenser outlet measured 104.7° F. and the vehicle failed the test. After removing 4 oz of R-134a refrigerant, the revised condenser inlet reading was 155.1° F. and the outlet reading was 114.8° F. This example shows an overcharged condition and too high of a differential, which was corrected by removing some refrigerant bringing the differential back down to the acceptable performance. The vent temperature after removing the excess refrigerant dropped slightly to 51.0° F.

Example 5

The air-conditioning system—TXV type (R-134a refrigerant, 750 grams) in a 1999 Mercedes ML430 SUV (4.3 liter engine) was performance tested and diagnosed with the simplified device of the present invention. The owner complained that vent air from the air-conditioning system was not cold enough.

Figure 6:
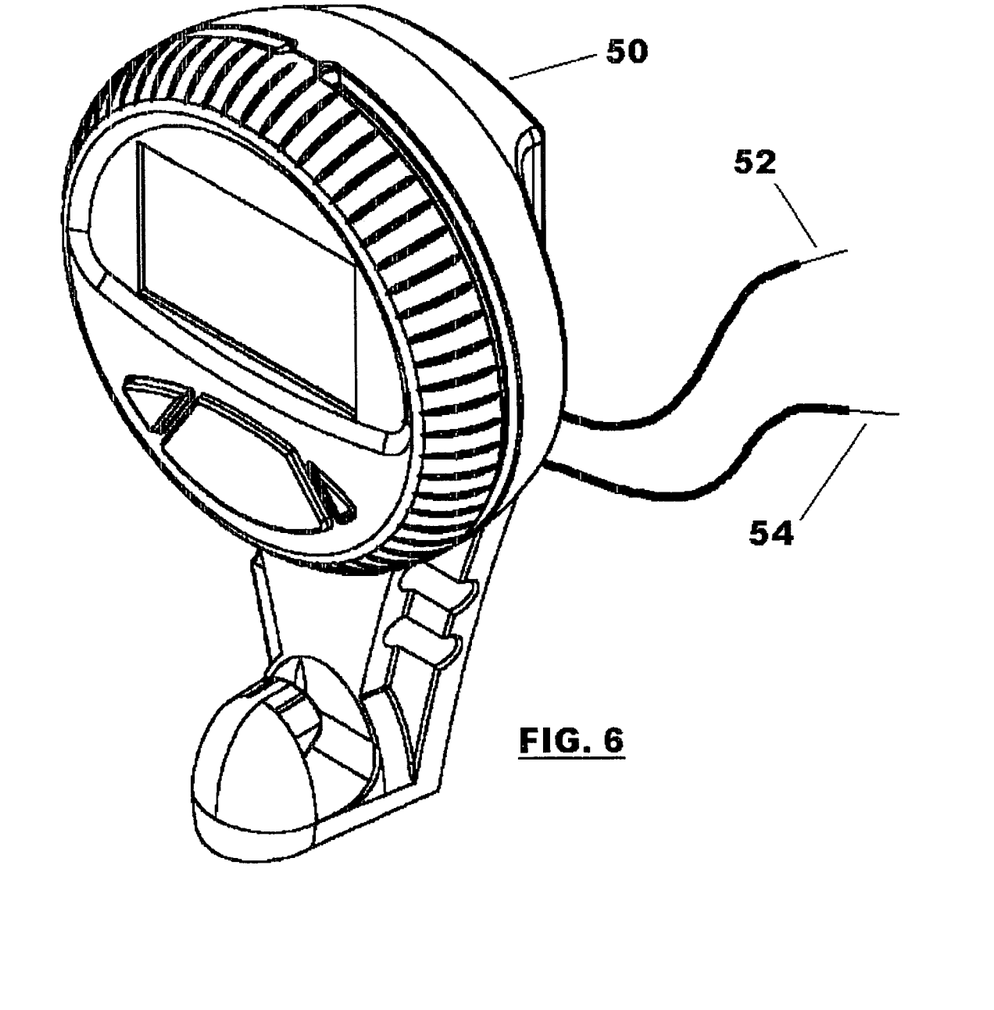
FIG. 6 is an illustration of a simplified temperature differential device showing the ambient probe and the vent probe.

The simplified device 50 was connected to the vehicle at the condenser air inlet (ambient) via the ambient probe 52 and the interior AC vent of the air-conditioning system via the vent probe 54. The apparatus measured ambient and vent temperatures and calculated the differential. The ambient reading was 81.1° F. and the vent was 56.9° F. This resulted in a failure. After 170 grams of R-134a was added, the ambient temperature read 81.8° F. and the vent read 52.8° F., giving a pass result. This result clearly shows that a low refrigerant charge was verified and corrected using the device.

Example 6

The air-conditioning system—fixed orifice type R-134a refrigerant, in a 2003 Ford Expedition was performance tested and diagnosed with the simplified device of the present invention. The owner complained that vent air from the air-conditioning system was not cold enough.

The simplified device of the present invention was connected to the condenser of the air-conditioning system. The device measured inlet and outlet temperatures and calculated the differential. It also recorded ambient and vent temperatures. The ambient read 74.1° F. and the air-conditioning vent read 50.1° F., which indicated that the system failed the test. The condenser inlet read 116.4° F. and the outlet read 105° F. The vehicle was low on refrigerant.

Preferred embodiments of the simplified temperature differential device are shown in FIGS. 6, 7A, 7B, 7C, 8A, 8B and 8C.

Figure 7A:
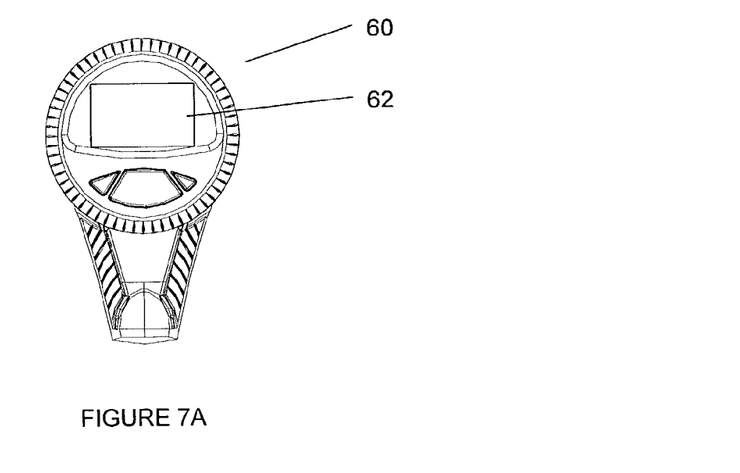
FIG. 7A is an illustration of a simplified temperature differential device with two remote probes (not shown), i.e., a two-wire variant, for measuring ambient and vent temperatures, and an LCD readout for displaying these temperatures as well as indicating a PASS/FAIL diagnosis.

FIGS. 6 and 7A are illustrations of simplified temperature differential devices, 50 and 60, respectively, with two remote probes (shown in FIG. 6 as 52 and 54, not shown in FIG. 7A), i.e., a two-wire variant, for measuring ambient and vent temperatures, and an LCD readout 62 for displaying these temperatures as well as indicating a PASS/FAIL diagnosis.

Figure 7B:
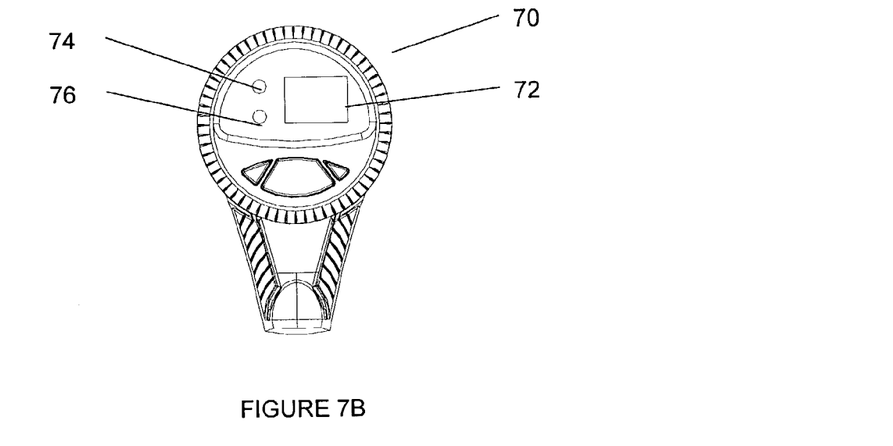
FIG. 7B is an illustration of a simplified temperature differential device with two remote probes for measuring ambient and vent temperatures, an LCD readout for displaying these temperatures and two LEDs, green and red, indicating a PASS/FAIL diagnosis, respectively.

FIG. 7B is an illustration of a simplified temperature differential device 70 with two remote probes (not shown) for measuring ambient and vent temperatures, an LCD readout 72 for displaying these temperatures and two LEDs, green 74 and red 76, indicating a PASS/FAIL diagnosis, respectively.

Figure 7C:
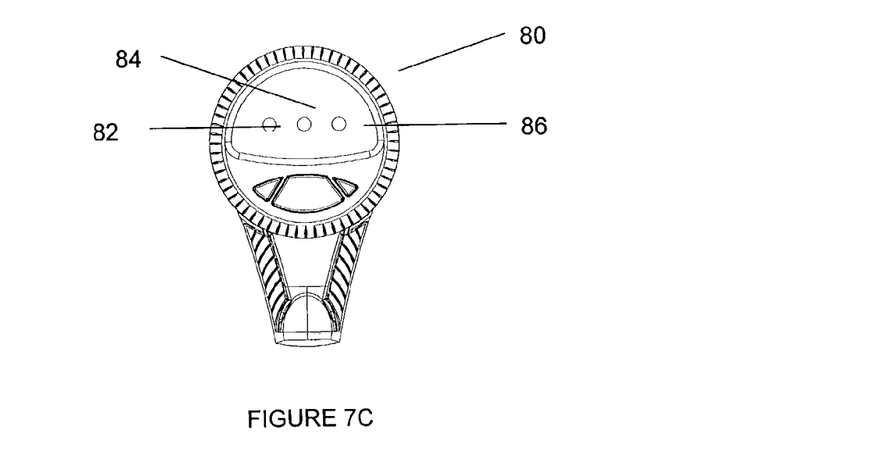
FIG. 7C is an illustration of a simplified temperature differential device with two remote probes for measuring ambient and vent temperatures, no readout for displaying these temperatures and three LEDs, green, amber and red, indicating a PASS/ACCEPTABLE/FAIL diagnosis, respectively.

FIG. 7C is an illustration of a simplified temperature differential device 80 with two remote probes (not shown) for measuring ambient and vent temperatures, no readout for displaying these temperatures and three LEDs, green 82, amber 84 and red 86, indicating a PASS/ACCEPTABLE/FAIL diagnosis, respectively.

Figure 8A:
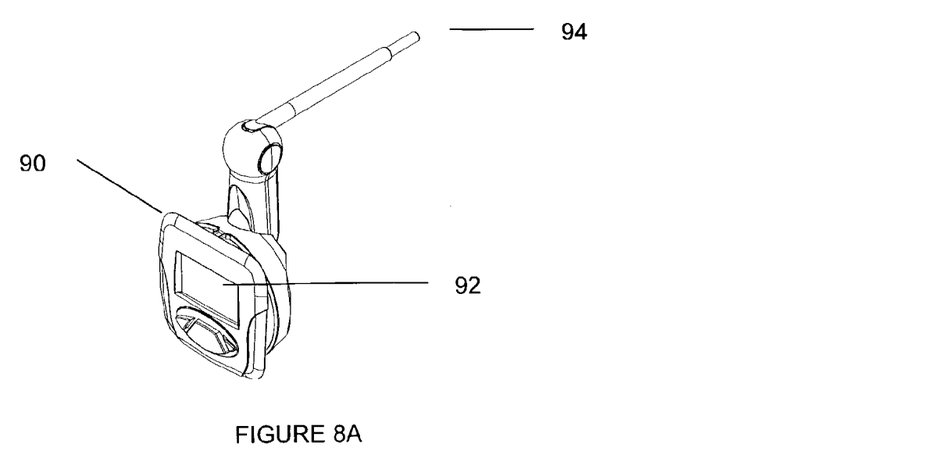
FIG. 8A is an illustration of a simplified temperature differential device with two probes, a remote ambient probe and an integral vent probe, i.e., probe variant, for measuring ambient and vent temperatures, and an LCD readout for displaying these temperatures as well as indicating a PASS/FAIL diagnosis.

FIG. 8A is an illustration of a simplified temperature differential device 90 with two probes, a remote ambient probe (not shown) and an integral vent probe 94, i.e., probe variant, for measuring ambient and vent temperatures, and an LCD readout 92 for displaying these temperatures as well as indicating a PASS/FAIL diagnosis. This variant has the advantage of only one wire, which is easier to use and store, however the operator has to be in the vehicle to do the test.

Figure 8B:
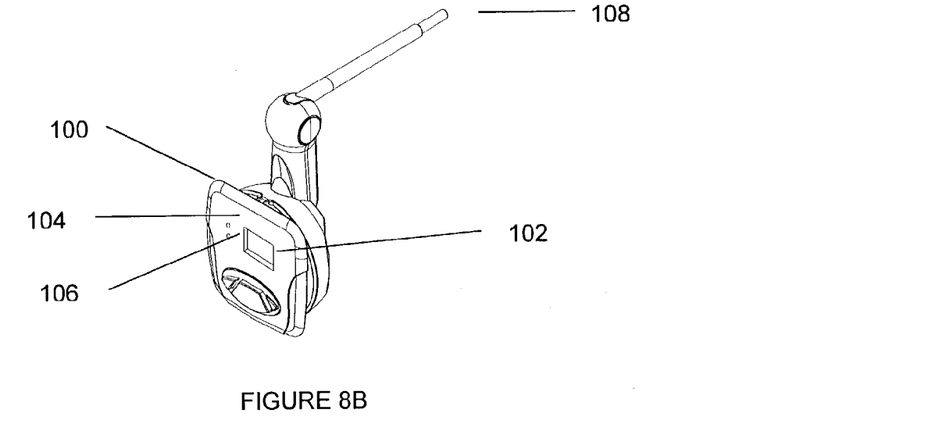
FIG. 8B is an illustration of a simplified temperature differential device with two probes, a remote ambient probe and an integral vent probe for measuring ambient and vent temperatures, an LCD readout for displaying these temperatures as well as two LEDs, green and red, indicating a PASS/FAIL diagnosis, respectively.

FIG. 8B is an illustration of a simplified temperature differential device 100 with two probes, a remote ambient probe (not shown) and an integral vent probe 108 for measuring ambient and vent temperatures, an LCD readout 102 for displaying these temperatures as well as two LEDs, green 104 and red 106, indicating a PASS/FAIL diagnosis, respectively.

Figure 8C:
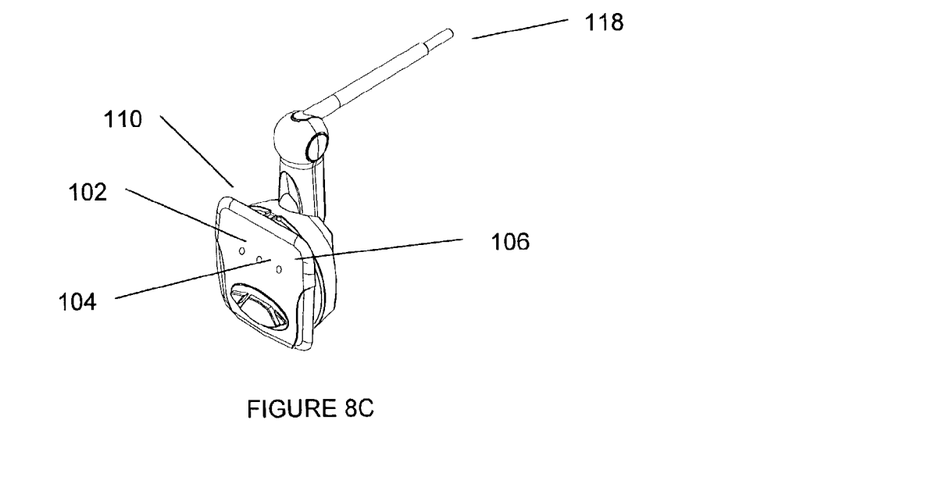
FIG. 8C is an illustration of a simplified temperature differential device with two probes, a remote ambient probe and an integral vent probe for measuring ambient and vent temperatures, no readout for displaying these temperatures and three LEDs, green, amber and red, indicating a PASS/ACCEPTABLE/FAIL diagnosis, respectively.

FIG. 8C is an illustration of a simplified temperature differential 110 device with two probes, a remote ambient probe (not shown) and an integral vent probe 118 for measuring ambient and vent temperatures, no readout for displaying these temperatures and three LEDs, green 112, amber 114 and red 116, indicating a PASS/ACCEPTABLE/FAIL diagnosis, respectively.

While the invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the appended claims.

Thus, it is to be understood that variations in the present invention can be made without departing from the novel aspects of this invention as defined in the claims. All patents and articles cited herein are hereby incorporated by reference in their entirety and relied upon.

TABLE 1

| Code # | Symptom | Possible Cause |
|---|---|---|
| Code 1 | Indicates the system is performing as designed and all supporting systems are operational. | |
| Code 19 (2) | Proper heat transfer is not occuring in the Condesor or supporting components | Condenser internal restrictions Fan Clutch (rear wheel drive vehicles) Condenser cooling fan operation (high ampere draw) Engine cooling system (Radiator) Vehicle air dam (missing or damaged) Vehicle equiped with frontal bra restricting airflow Condensor sealing gaskets Compressor discharge hose with muffler Trash between condenser and vehicle radiator Mixed refrigerants (contaminated with air) |
| Code 3 | Temperature drop across evaporator is to high | System undercharge Orifice tube restriction Or Temperature decreases across evaporator System overcharged Mixed or contaminated refrigerant |
| Code 21 (4) | Not enough heat transfer across condensor and too much heat transfer across evaporator | Mixed or Contaminated refrigerant Condensor internal restrictions Fan Clutch (Rear wheel Drive vehicles) Condenser cooling fan operation Engine cooling system (radiator) Condenser sealing gaskets |

TABLE 1-continued

| Code # | Symptom | Possible Cause |
|---|---|---|
| | | Trash between condenser and radiator System overcharged or posssibly undercharged |
| Code 7 | Not enough temperature drop between ambient air and vent outlet temp | Heater controls operation |
| Code 25 (8) | Not enough temp drop between vent temp and ambient air and not enough temp drop between condenser in and out | Heater controls operation Plugged or restricted condenser operation Overcharge condition |
| Code 9 | Not enough temp drop between vent temp and ambient air and too much temp drop across evaporator | Heater controls operation Mixed refrigerant Undercharged |
| Code 27 (10) | Not enough temp drop across all ranges (evap, condenser, ambient) | Mixed refrigerant Severe undercharge Condensor restriction Severe overcharge |
| TXV sytems diagnosis | | |
| Code 1 | Everything OK | |
| Code 34 (11) | Not enough temp drop across condensor | Mixed refrigerant or contaminated |
| Code 30 (12) | Not enough temperature between ambient air & vent outlet temperature | Heater controls operation |
| Code 25 (13) | Note enough temp drop between vent temp and ambient air as welt as not enough temp drop between condensor in and out | Heater controls operation Plugged or restricted condenser operation Overcharge condition |

TABLE 2

| Vehicle Test # System Type | 1A TXV | 1B TXV | 2A Orifice | 2B Orifice | 3A Orifice | 3B Orifice |
|---|---|---|---|---|---|---|
| Condenser In | 149 | 153 | 136 | 148 | 124 | 132 |
| Condenser Out | 116 | 121 | 89 | 116 | 91 | 99 |
| Pass/Fail | P | P | P | P | P | P |
| Evaporator In | 86 | 92 | 43 | 45 | 54 | 58 |
| Evaporator Out | 87 | 93 | 73 | 50 | 71 | 53 |
| Pass/Fail | P | P | F | P | F | P |
| Ambient | 86 | 93 | 84 | 84 | 79 | 79 |
| Vent | 66 | 50 | 68 | 49 | 49 | 45 |
| Pass/Fail | F | P | F | P | P | P |

Legend
All temperatures expressed in ° F.
TXV: thermal expansion valve.
Orifice: orifice tube.

What is claimed is:

1. A device for verifying a proper heat exchange and overall performance of an air-conditioning system, comprising:
   a) a manually operated means for measuring a temperature differential between ambient and vent temperatures of the air-conditioning system, wherein said means comprises:
   a probe for measuring the ambient temperature and at least one probe for measuring vent temperatures, wherein at least one of the probes is connected to a portable housing through a cable connection; and
   b) a battery powered and manually controlled means housed in the portable housing for analyzing the temperature differential and giving a visual indication of performance of the air-conditioning system.

2. The device of claim 1 wherein a probe is integrated into the housing.

3. The device of claim 1 wherein the probe for measuring ambient temperature is integrated into the housing.

4. The device of claim 1, wherein a temperature differential of greater than 25°πF. between the ambient and vent temperature is determinative of whether the air-conditioning system is properly functioning.

5. The device of claim 1, further comprising means to automatically adjust the temperature differential for changing ambient temperatures using an algorithm, thereby changing a pass/fail indication point.

6. The device of claim 1, further comprising an LCD display.

7. The device of claim 1, further comprising at least one LED.

8. The device of claim 1, wherein the visual display provides an indication of either a pass or fail diagnosis.

9. The device of claim 1, further comprising at least three LEDs.

10. The device of claim 1, wherein the visual indication includes either a pass, acceptable or fail indication.

11. A device for verifying a proper heat exchange and overall performance of an air-conditioning system, comprising:
  a) a manually operated means for measuring a temperature differential between ambient and vent temperatures of the air-conditioning system, wherein said means comprises:
  a probe for measuring the ambient temperature and at least one probe for measuring vent temperatures, wherein at least one of the probes is connected to a portable housing through a cable connection; and
  b) a manually controlled means housed by the portable housing for analyzing the temperature differential and giving a visual indication of performance of the air-conditioning system.

12. The device of claim 11, wherein a temperature differential of greater than 25° F. between the ambient and vent temperature is determinative of whether the air-conditioning system is properly functioning.

13. The device of claim 12, further comprising means to automatically adjust the temperature differential for changing ambient temperatures using an algorithm, thereby changing a pass/fail indication point.

14. The device of claim 11, further comprising an LCD readout for displaying the temperatures.

15. The device of claim 11, further comprising at least one LED.

16. The device of claim 11, further comprising means for indicating a pass/fail diagnosis.

17. The device of claim 11, further comprising at least three LEDs.

18. The device of claim 11, further comprising means for indicating a pass/acceptable/fail diagnosis.

19. A device for verifying a proper heat exchange and overall performance of an air-conditioning system, comprising:
  a) a manually operated means for measuring a temperature differential between ambient and vent temperatures of the air-conditioning system, wherein said means comprises:
  a probe for measuring the ambient temperature and at least one probe for measuring vent temperatures, wherein at least one of the probes is integral with a portable housing; and
  b) a manually controlled means housed in the portable housing for analyzing the temperature differential and giving a visual indication of performance of the air-conditioning system.

* * * * *

UNITED STATES PATENT AND TRADEMARK OFFICE
CERTIFICATE OF CORRECTION

PATENT NO. : 7,146,290 B2　　　　　　　　　　　　　　　　　　　　Page 1 of 1
APPLICATION NO. : 10/374006
DATED : December 5, 2006
INVENTOR(S) : Phil Trigiani, Tony Ferraro and William Frederick Walters It is certified that error appears in the above-identified patent and that said Letters Patent is hereby corrected as shown below:

Title Page; item (75);
Please correct the name of inventor --Phil Triginai-- to "Phil Trigiani"

Signed and Sealed this

Twenty-second Day of December, 2009

David J. Kappos
*Director of the United States Patent and Trademark Office*